April 29, 1947.  W. R. GALTER  2,419,715
CAMERA SPRING DEVICE
Filed Oct. 15, 1945
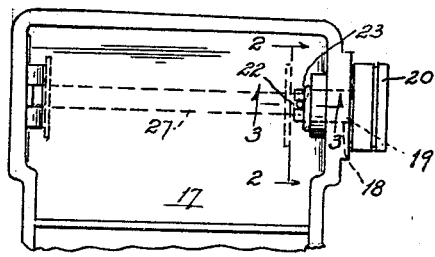
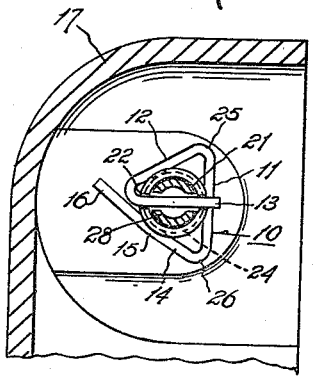
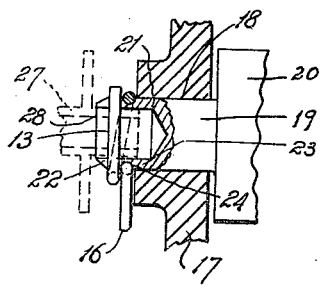
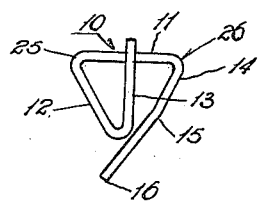
Inventor:
William R. Galter.
by James R. McKnight
Attorney.

Patented Apr. 29, 1947

2,419,715

UNITED STATES PATENT OFFICE 2,419,715

CAMERA SPRING DEVICE

William R. Galter, Chicago, Ill.

Application October 15, 1945, Serial No. 622,246

1 Claim. (Cl. 242—71)

My invention relates to means for preventing a spool turning device from being withdrawn from a camera casing, said means also providing a bearing for turning the spool.

Among the objects of my invention, is to provide a spring adapted to be attached to the shank of a turnable member in cameras or other devices, to prevent unauthorized withdrawal of the turnable member from the casing, and which will also act as a driving member for turning a spool contacting said turnable member. My spring, formed from wire, in a single operation, is more economical in construction, more easily assembled, more positive in action, and lasting in wear. My spring is also self-holding, but may be simply removed if desired.

My invention also contemplates such other objects, advantages and capabilities as will later more fully appear and which are inherently possessed by my invention.

While I have disclosed herein a preferred embodiment of my invention, yet I wish it understood that the same is susceptible of modification and change without departing from the spirit of my invention.

Referring to the drawings, Fig. 1 is a plan view of part of a camera, showing the use of my spring device; Fig. 2 is an enlarged view on line 2—2 of Fig. 1; Fig. 3 is an enlarged sectional view on line 3—3 of Fig. 1; and Fig. 4 is a front elevational view of my spring.

The embodiment selected to illustrate my invention comprises a spring or resilient member 10, formed of metal wire or other suitable material. It is substantially triangular in general outline, and has a top laterally extending portion 11. From one end of lateral portion 11, integral short angular portion 12 extends downwardly and inwardly, and from its lower end integral vertical portion 13 extends upwardly and slightly beyond the center of lateral portion 11.

From the other end of lateral portion 11, integral long angular portion 14, extends inwardly and downwardly, with its central portion 15 spaced from vertical portion 13, where it joins short angular portion 12. From central portion 15 to the outer end 16, long angular portion 14 extends slightly more inwardly in its diagonal descent.

My spring 10 is used in the casing 17 of a camera, which has an opening 18, to receive the shank 19 of a manually turnable member 20. The inner end of the shank extends within casing 17 and has a hollow end 21, with a groove 22 cut through its sidewall 23 at its inner end. My spring is mounted on shank 19 with a vertical portion 13 positioned within groove 22 and central portion 15 of long angular portion 14 and portions of short angular portion 12 and top lateral portion 11 within circular slot 24 in sidewall 23. The portions of my spring 10, not within slot 24, such as end portion 16 and corners 25 and 26, bear against the inner wall of casing 17 preventing unauthorized withdrawal of turnable member 20 from casing 17.

When spool 27 is inserted in casing 17 bifurcated end 28 extends within hollow end 21 of shank 19 and straddles vertical portion 13 of spring 10, which provides a bearing surface for turning the spool 27 when turnable member 20 is actuated.

Having thus described my invention, I claim:

In a casing having a turnable member extending within the casing, the turnable member having a groove and a circular slot adjacent its inner end, a substantially triangularly shaped spring having a laterally extending top portion, a short portion extending downwardly and inwardly from one end of said laterally extending portion, a vertical portion extending from the lower end of said short portion upwardly and slightly beyond the center of said laterally extending portion, a long portion extending downwardly and inwardly from the other end of said laterally extending portion with its outer end extending beyond the lower end of said vertical portion, said downwardly and inwardly extending portions and said laterally extending portion forming corners at their conjunctions, said vertical portion positioned within said groove, the central portions of said laterally extending portion and said downwardly and inwardly extending portions positioned for a three point contact within said circular slot, said corners and said outer end of said long downwardly and inwardly extending portion forming a three point contact with the inside of said casing to prevent undesired withdrawal of said turnable member from said casing, said vertical portion adapted to contact the end of a spool and turn the spool upon rotation of the turnable member.

WILLIAM R. GALTER.

REFERENCES CITED

The following references are of record in the file of this patent:

UNITED STATES PATENTS

| Number | Name | Date |
|---|---|---|
| 2,213,492 | Galter | Sept. 3, 1940 |